Aug. 29, 1967  E. R. DUDLEY  3,338,374
MAGNETIC CONVEYOR

Filed Feb. 9, 1965  6 Sheets-Sheet 1

INVENTOR.
EDMOND R. DUDLEY
BY
ATTORNEYS

Aug. 29, 1967 E. R. DUDLEY 3,338,374
MAGNETIC CONVEYOR

Filed Feb. 9, 1965 6 Sheets—Sheet 3

INVENTOR.
EDMOND R. DUDLEY

BY
ATTORNEYS

Aug. 29, 1967     E. R. DUDLEY     3,338,374
MAGNETIC CONVEYOR
Filed Feb. 9, 1965     6 Sheets-Sheet 5

INVENTOR.
EDMOND R. DUDLEY
BY
ATTORNEYS

INVENTOR.
EDMOND R. DUDLEY

BY
ATTORNEYS

United States Patent Office 3,338,374
Patented Aug. 29, 1967

3,338,374
MAGNETIC CONVEYOR
Edmond R. Dudley, Santa Clara, Calif., assignor to Peco Corporation, Mountain View, Calif., a corporation of California
Filed Feb. 9, 1965, Ser. No. 431,288
14 Claims. (Cl. 198—41)

This invention relates to conveyors and more particularly to magnetic conveyors for conveying and handling articles of magnetic material.

Cable-type conveyors for transferring items such as cans from place to place are well known and include an endless driven article propelling member such as a cable, chain, belt or the like having a forward and a return run. A guideway extends longitudinally of the article propelling member to maintain the articles in registry with said article propelling member along the forward run thereof. Generally, such conveyors are only usable for substantially horizontal runs, since the cans or other articles being conveyed will slide along the conveyor and/or tip over if the conveyor is inclined at too great an angle.

To prevent such slipping or tipping with endless belt conveyors, it is known to include stationary magnets behind the belt which attract the magnetic articles against the belt. With this arrangement, however, the magnets are spaced at least the thickness of the belt from the articles being conveyed. For maximum attraction thin non-magnetic belts are desired. The belts, however, must also be sufficiently strong so a compromise between belt thickness and strength is often required in the design of such conveyors. Further, the belt must be of nonmagnetic material to prevent the diversion of the magnetic flux field from the articles being conveyed.

An object of this invention is the provision of a magnetic conveyor which is simple and economical to construct and to operate.

An object of this invention is the provision of a conveyor having an improved magnetic system which includes magnetic polar surfaces closely positioned adjacent the magnetic articles being conveyed for maximum attraction of said articles toward the endless article propelling member of the conveyor.

An object of this invention is the provision of a magnetic conveyor capable of operating at high speeds without scratching and bumping of the cans being conveyed.

An object of this invention is the provision of a magnetic conveyor system of the type which includes an endless driven article propelling member having forward and return runs, which forward run may include both generally horizontal and vertical sections over which magnetic articles may be conveyed.

An object of this invention is the provision of a magnetic conveyor system having one or more novel magnetic pulleys included therein over which an endless driven article propelling member travels.

An object of this invention is the provision of a magnetic pulley or sheave for use in a conveyor system for changing direction of travel of an endless article propelling member engaged therewith.

The above and other objects and advantages of the invention are obtained by means of an arrangement which includes a driven endless article propelling member. A guideway may be included which extends longitudinally of the article propelling member and serves to maintain the articles being conveyed in registry with said article propelling member. In accordance with this invention a magnetic system is provided which includes magnetic polar surfaces disposed laterally from said article propelling member. The articles being conveyed also extend laterally of said article propelling member and a narrow flux gap is formed between the magnetic polar surfaces and the bottoms of the articles being conveyed. The magnetic articles, such as cans, being conveyed by the conveyor are thereby attracted toward the article propelling member into engagement therewith. Since the magnetic polar surfaces are laterally disposed from the article propelling means they may be closely spaced adjacent the articles conveyed with a minimum length air gap formed therebetween. With this arrangement there is no requirement that the magnetic flux field extend through the article conveying means (although in some configurations the magnetic flux field may extend therethrough). Where the conveyor system includes a generally horizontal run the magnets may be dispensed with and that portion of the conveyor operated as a conventional conveyor apparatus thereat. Either the magnets themselves, or magnetic pole pieces attached thereto may be laterally disposed from the article propelling member for attraction thereto of the articles being conveyed.

To change the direction of travel of the endless article propelling member it may be extended about pulleys, and the elongated member with the attached magnets curved about the pulleys. Alternatively, also in accordance with this invention, novel magnetic pulleys may be employed which pulleys are provided with an annular groove for the endless article propelling member and an additional adjacent annular groove, or grooves in which permanent magnets are disposed. In one arrangement the grooves are located in the outer periphery of the pulley, and the groove for the article propelling member is formed deeper than the height of said propelling member whereby the articles are attracted by the magnets into direct contact with the pulley. The outer periphery of the pulley is preferably formed with a crown whereby the leading and trailing edges of rims formed at the ends of the cans being conveyed engage said crown for stable support of the cans on the pulley.

In another pulley arrangement embodying this invention the magnets are carried in a groove formed in a side wall or face of the pulley, and the groove for the article propelling member is formed in the outer periphery thereof, adjacent the side face bearing the magnets. With this arrangement the conveyed articles are attracted by said magnets toward the side face of the pulley rather than the outer periphery thereof.

In the drawings wherein like reference characters refer to the same parts in the several views.

Figure 1:
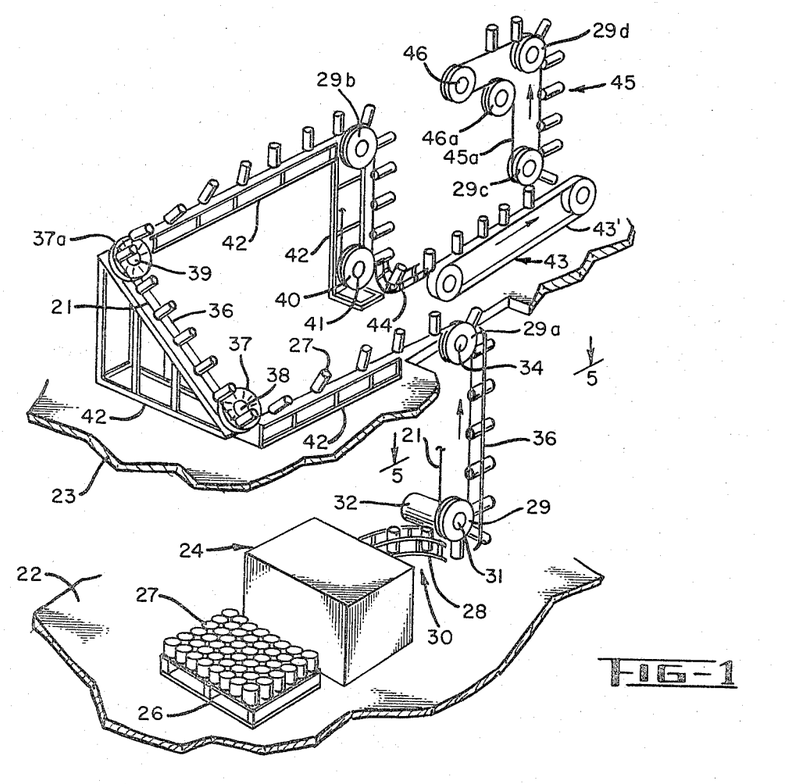
FIGURE 1 is a diagrammatic perspective view of a conveyor system embodying this invention.

Referring first to FIGURE 1 of the drawings, there is shown in schematic diagram form a conveyor system which includes an article propelling member 21 which may comprise an endless cable, chain, belt or the like. In FIGURE 1 only a portion of the return run thereof is shown for clarity. However, it is well understood the return run of the cable may be supported by pulleys a spaced distance from the forward cable run.

Numerous different conveyor systems may be constructed employing the apparatus of this invention and the system shown in FIGURE 1 is illustrative of one such system. Conveyor systems are of course, designed to meet the particular needs of the individual and the apparatus of this invention is not limited for use in any particular system. For purposes of illustration the first and second floors 22 and 23, respectively, of a building are shown, and a depalletizer 24 of conventional design is shown on the first floor. A pallet 26 loaded with cans 27 is shown on the floor adjacent the depalletizer ready for loading therein. At least a portion of each of the cans 27, if not the entire can, is made of magnetic material for attraction by magnets included in the novel conveyor system.

From the depalletizer apparatus 24 the cans 27 are slid on one end thereof down a can supporting rail 28 included in a chute 30 and fed into the conveyor system for propulsion by the cable 21. The cable 21 extends around a novel pulley 29 fixedly secured to the shaft 31 of a motor 32 for drive actuation of the cable. The pulley 29 includes magnets thereon for magnetic attraction of the cans 27 thereto. The forward run of the cable 21 extends generally vertically from the pulley 29 to a second pulley 29a (of the same type as pulley 29 but provided with a different reference character for purposes of identification), which pulley 29a is rotatably supported on a shaft 34 at the second floor level. Side guide rails 36 extend along the cable to maintain the cans in registry therewith. The conveyor section between the pulleys 29 and 29a is of novel design and includes a novel magnetic system for maintaining the cans in engagement with the cable. The novel conveyor and novel pulley 29 are described in detail hereinbelow.

Continuing the description of the system shown in FIGURE 1, from the pulley 29a there is a generally horizontal forward run of the cable 21 to another novel magnetic pulley 37 which embodies this invention and which pulley is also described in detail hereinbelow. The pulley 37 is rotatably supported on a pivot pin 38 which extends at an angle of about 45° from the horizontal. The conveyor section between the pulleys 29a and 37 is twisted through an angle of about 45° for turning the cans so the can axes are parallel to the axis of the pulley 37 at said pulley.

From the pulley 37 the forward run of the cable 21 extends upwardly at an angle of about 45° to another pulley designated 37a which is of the same design as pulley 37 but provided with a different reference character for purposes of identification. The pulley 37a is mounted for rotation about an axis 39 parallel to the axis of the pivot pin 38. From the pulley 37a the forward run of the cable is again generally horizontal and passes over a pulley 29b rotatably supported about a horizontal axis. The conveyor section between the pulleys 37a and 29b twists through an angle of 45° to return the can axes to a generally vertical plane when the cans reach the pulley 29b.

From the pulley 29b the cans are lowered through a cable run which extends generally vertically downward to a pulley 40 of conventional design and rotatably supported on a generally horizontally extending pivot pin 41. The conveyor section between the pulleys 29b and 40 includes the novel magnetic system of this invention for maintaining the cans on the cable 21. The return run of the cable 21 extends from the pulley 40 and over suitable pulleys, not shown, back to the pulley 29. Only a fragmentary portion of the cable 21 at opposite ends of the return run are shown in the drawings since the return run may be of any conventional design. Suitable conveyor supporting structure such as the framework 42 may be employed for the support of the conveyor.

From the end of the forward run of the cable 21, the cans are transferred onto a conventional belt conveyor 43 through a slide 44 which may also be of conventional design. The belt 43' of the conveyor 43 is driven by means not shown, at approximately the same speed as the cable 21.

The pulley and conveyor apparatus of this invention may be employed in a novel transfer device for removal of the cans from the conveyor 43. As seen in FIGURE 1, the cans 27 are transferred from the conveyor 43 to another conveyor 45 which includes novel magnetic pulleys 29c and 29d of the same type as the pulleys 29, and 29a and 29b mentioned above. The forward run of the article propelling member 45a of the conveyor 45 extends from the pulley 29c, to the pulley 29d and thence to a driven pulley 46. The return run of the article propelling member 45a from the pulley 46 to the magnetic pulley 29c passes over an idler pulley 46a. The conveyor section between the pulleys 29c and 29d may be of the same novel design as the section between the pulleys 29 and 29a described in detail hereinbelow. The conveyor 45 is driven at approximately the same speed as the conveyor 43, and the spacing between the magnetic pulley 29c and the belt 43' is slightly greater than the height of the cans 27 being conveyed. The cans propelled by the conveyor 43' are driven substantially tangentially of the magnetic pulley 29c and are attracted to said pulley and onto the conveyor 45. From the pulley 29c the cans are conveyed upwardly along a novel magnetic conveyor section over the magnetic pulley 29d, and thence along a generally horizontal non-magnetic run of the conveyor. With this novel transfer arrangement between conveyors 43 and 45 the cans are under positive control of one or the other conveyor at all times during the transfer whereby damage to the cans is minimized. Although the arrangement may be used for the transfer of either full or empty cans, for some operations the use with empty cans is avoided since the open ends of the cans contact the conveyor 45 and could become contaminated.

Figure 2:
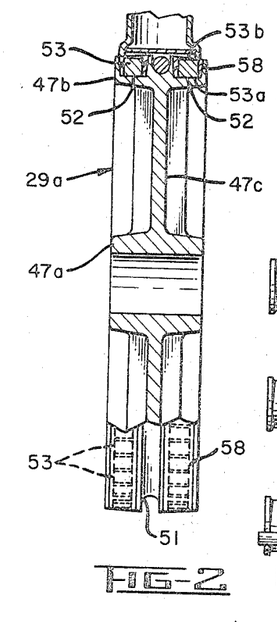
FIGURE 2 is a front elevational view with parts shown broken away for clarity of a novel pulley embodying this invention and employed in the system shown in FIGURE 1.
Figure 3:
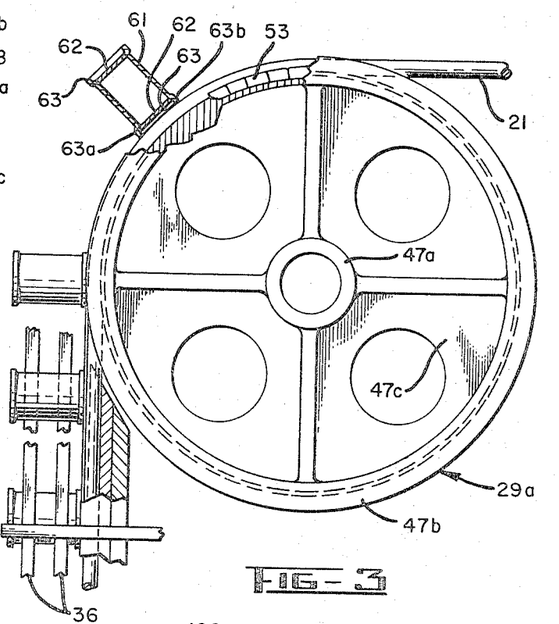
FIGURE 3 is a side elevational view of the pulley shown in FIGURE 2 and showing also a fragmentary portion of the conveyor line which embodies this invention.

As mentioned above, the pulleys 29 through 29d are of the same construction so a description of one applies to them all. Reference is made to FIGURES 2 and 3 for a detailed showing of the pulley 29a. As seen therein the pulley comprises a hub 47a, connected to an outer rim section 47b through a disc 47c. In the illustrated embodiment of the pulley, at least the outer rim section 47b thereof, is made of magnetic material to provide a low reluctance magnetic flux path. The rim is formed with a central annular groove 51 in the outer face thereof for the article propelling cable 21. The groove 51 is formed deeper than the height (or thickness) of the cable 21 whereby the entire cable is disposed radially inwardly of the pulley surface when in the groove.

A pair of annular grooves 52 is formed in the face of the pulley at opposite sides of the groove 51 for the reception of permanent magnets 53. The magnets are generally rectangular in shape and have generally parallel opposite polarity polar surfaces 53a and 53b. In the embodiment illustrated in FIGURES 2 and 3, all of the like polarity surfaces 53a abut the bottom of the groove and may be secured thereto as by cementing, if desired. The sides of the magnets are a spaced distance from the side walls of the grooves to prevent short circuiting of the magnetic flux field. The ends of adjacent magnets may be in abutting relation. Although the magnets may be made of any suitable material, ceramic magnets are preferably employed since they are capable of providing a large flux density and are easily cut and formed to size. The magnets are embedded in suitable non-magnetic plastic material 58 which extends along both sides of the magnets and which may thinly cover the outer polar surfaces 53b thereof.

The magnetic articles such as cans 27 are attracted to the pulley by the magnets 53. A typical can includes a can body 61 with can ends 62 joined thereto by means of rolled end seams or rims 63. A small hollow is formed at the ends of the cans where the rims 63 extend therebeyond. In accordance with this invention the face of the pulley rim is rounded, or tapered radially inwardly from the center thereof to the opposite sides to form a crown along the center. In the illustrated arrangement the surfaces are tapered at an angle of about 5°, although it will be understood that such angle is not critical. With such crowned pulley the leading and trailing rim edges designated 63a and 63, respectively, of the cans engage the pulley. Without the crown on the pulley, the leading and trailing edges would be spaced from the pulley surface permitting the cans to rock forward and backward with changes in speed of the article propelling means. In an arrangement, not illustrated, the face of the pulley may comprise a segment of a sphere having a diameter equal to the pulley diameter. That is, the face of the pulley may be curved with the radius of curvature across the face equal to the radius of the pulley. With this arrangement a substantial portion of the can rim will engage the pulley for stable support of the can thereon. Lateral support for the cans, as mentioned above, is also provided by the guide rails 36, a fragmentary portion of which rails are shown in FIGURE 3. The novel crown construction alone or the crown construction together with the side guide rails provide for the stable support of the cans on the pulley.

With the magnets 53 laterally displaced from the article propelling means 21, the polar surfaces 53b thereof may be located closely adjacent the cans 27 being conveyed. The magnetic flux gap between the magnets and cans may be minimized for efficient use of the magnets.

Conveyor systems are adapted for operation at very high speeds on the order of 1,000 cans per minute or greater. Feeding the cans onto a conveyor operating at such speeds is often difficult. With many arrangements the cans delivered to the conveyor slip along the cable before being brought to the cable speed, and if the cable is not smooth, scratching and denting of the cans often occurs. With the novel pulley 29 the cans from the depalletizer 24 may be brought up to speed by the pulley before the cans engage the cable 21 thereby avoiding the above-mentioned problems of scratching and denting.

Figure 4:
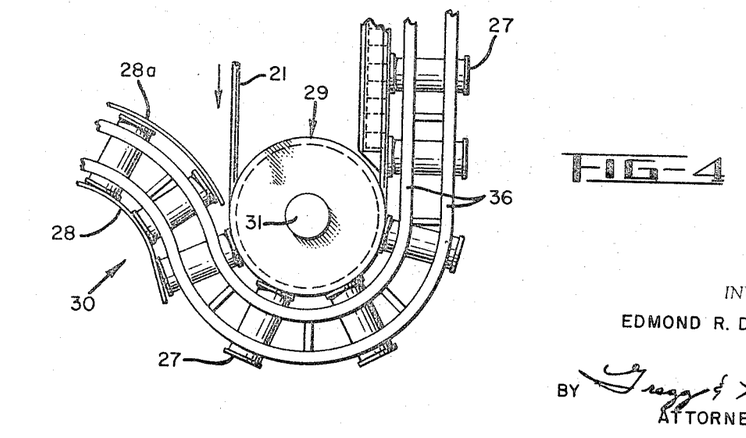
FIGURE 4 is a side elevational view of the same type of pulley shown in FIGURE 3 but showing in detail the arrangement for feeding cans thereto, which arrangement is schematically shown in FIGURE 1 of the drawings.

Referring to FIGURE 4 the cans from the depalletizer 24 (shown in FIGURE 1) are slid down the chute 30 which comprises bottom rail 28, top rail 28a and the side rails 36. From the chute the cans are discharged onto the pulley 29 at a point at which the cable 21 is disposed entirely within the pulley groove 51. The cans are attracted by the magnets 53 directly onto the pulley surface without engaging the cable 21. If the speed of the cans from the chute does not correspond to the speed of the pulley, sliding of the cans along the pulley may occur, but because the pulley surface is smooth no scratching of the cans occurs. By the time the cans are transported around to the discharge side of the pulley 29 at the forward run of the cable 21, they will have been brought up to the pulley speed. The cans 27, therefore, transfer onto the forward run of the cable 21 at the speed of the cable and no slippage between the cable and cans occurs. As mentioned above, cables or other article propelling means often have rough surfaces for engagement with the cans being conveyed and if the cans are not moved at the speed of the cable, scratching of the cans may occur. The in-feed apparatus employing the novel pulley 29 as described above avoids such scratching.

Figure 5:
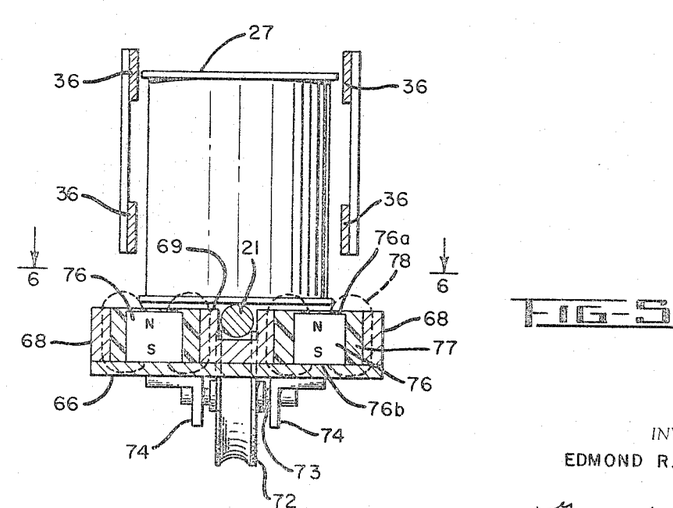
FIGURE 5 is an enlarged cross sectional view of the conveyor taken along line 5—5 of FIGURE 1.
Figure 6:
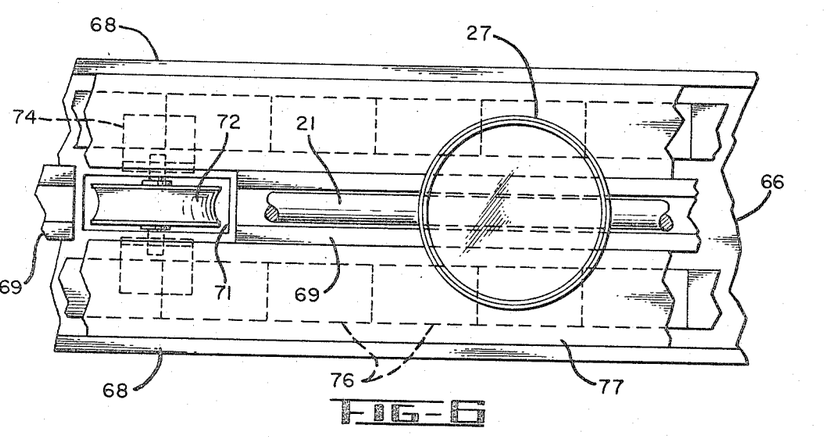
FIGURE 6 is a fragmentary sectional view taken on line 6—6 of FIGURE 5.

As described above, with reference to FIGURE 1, the cans from the pulley 29 are shown lifted along a vertical section of the novel conveyor. In FIGURE 5 a cross sectional view of the conveyor taken on line 5—5 is shown, and a view taken on line 6—6 of FIGURE 5 is shown in FIGURE 6. Referring to FIGURES 5 and 6, the conveyor is shown comprising an elongated base 66 of magnetic material supported on any suitable means not shown. (In FIGURE 1 of the drawings, various supporting standards 42 are shown for the support of the conveyor.) Side members 68 of magnetic material are attached to the base at the longitudinal edges thereof, and a cable supporting means 69 in the form of a U-shaped channel member extends along the center of the base. The side walls 68 and center channel member 69 may be welded or otherwise suitably secured to the base by any suitable means, not shown. If desired, the base 66 may be formed with central apertures 71 (one of which is shown in FIGURE 6) spaced therealong through which a pulley 72 extends for support of the cable 21 thereat. The pulleys may be supported on pivot pins 73 carried by L-shaped brackets 74 attached to the back of the base 66 as seen in FIGURE 5. The channel member 69 is shown cut away at the apertures 71 to accommodate the pulleys 72 thereat. If the pulleys 72 are located sufficiently close together, the channel member 69 may be eliminated, the cable being supported entirely on said pulleys. As a further alternative, the cable may be supported directly on the base 66 without the use of the channel member 69 or pulleys 72.

Magnets 76 of generally rectangular shape or attached to the base member 66 between the cable supporting channel member 69 and the side walls 68. In the embodiment illustrated in FIGURE 6, adjacent magnets 76 may be in abutting relationship. The sides of the magnets are, however, spaced from the side-walls 68 and the center channel member 69 to prevent short circuiting of the magnetic flux circuit. If desired, they may be attached to the base 66 by cementing or any suitable means not shown, and embedded in a non-magnetic plastic material 77.

The magnets 76 have generally parallel opposite polarity polar surfaces 76a and 76b, and in the arrangement illustrated in FIGURES 5 and 6 all the like polarity surfaces 76b are attached to the base 66. The other polarity surfaces 76a are substantially level with the front surfaces of the side walls 68 and channel 69. As seen in FIGURE 5, the end of the cans 27 are supported on the cable 21 and the cans are maintained in registry with the cable by the side rails 36. The side rails 36 also prevent the cans from tipping sideways onto the magnets. It is seen that a narrow air gap is formed between the magnet polar surface 76a and the can end. In addition to the narrow air gap, the magnetic flux path includes the can 27, the center channel member 69, cable 21, side walls 68 and the base member 66. With the south polar surfaces 76b attached to the base member 66 the side walls 68 and channel 69 comprise pole pieces of south polarity. Obviously, the polarity of the magnets 77 may be reversed, if desired. In FIGURE 5 the magnetic flux field is illustrated by the broken lines 78.

The cable 21 is seen to only extend slightly above the level of the channel 69, walls 68 and magnets 77 whereby the air gap between the north and south polarity surfaces and the cans is very small. With this arrangement the length of the magnetic flux path through non-magnetic material is minimized for maximum attraction of the cans against the cable 21. The magnets may be made of any suitable material but again ceramic magnets are preferred for their great magnetic strength and ease of manufacture.

With this novel conveyor arrangement, both empty and full cans may be elevated vertically as illustrated in FIGURE 1 between the pulleys 29 and 29a. With this arrangement larger and heavier cans may be elevated than is possible with most present magnetic conveyor systems. Also, such a conveyor may be made longer, with fewer magnets and requires less power to operate than prior art magnetic conveyor systems. Another advantage of this system includes the fact that the conveyor may be twisted any desired amount between pulley runs for any desired orientation of the cans. Thus, as shown in FIGURE 1 the conveyor is twisted through an angle of 45° between the puleys 29a and 37 and between the pulleys 37a and 29b. Obviously, the conveyor may be formed with any desired degree of twist. In addition, the cans could be conveyed in an inverted position with the conveyor of this invention if desired. Further, with the apparatus of this invention the requirement for separate elevators, horizontal conveyors, "twisters" and lowering conveyors is eliminated since the apparatus is readily capable of performing all these functions. Further, the magnets may be eliminated from the construction of the conveyor on generally horizontal runs where they are not required to keep the cans on the conveyor cable, or to prevent slipping and tipping of the cans thereon. It is seen therefore, that the apparatus is extremely versatile and adapted for numerous uses.

Figures 7, 8:
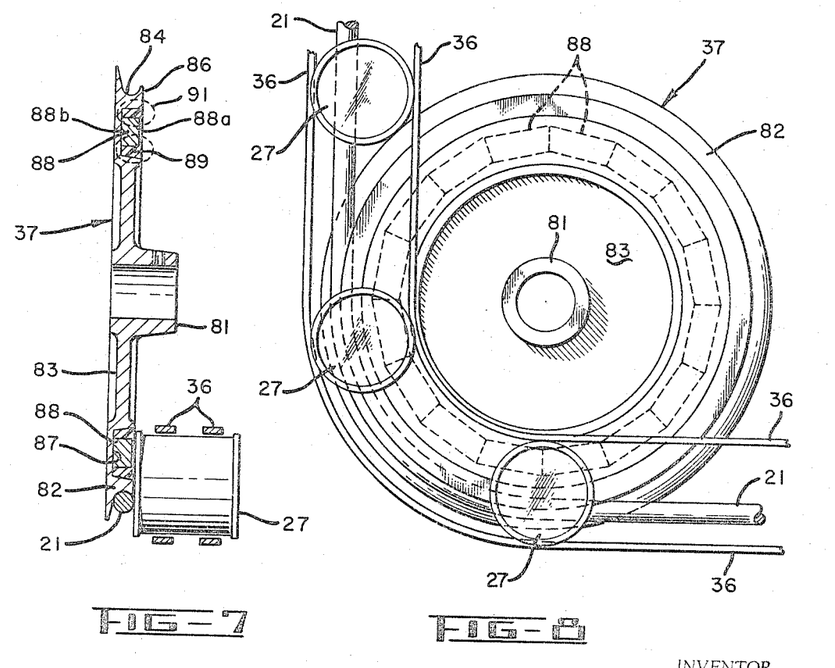
FIGURE 7 is a longitudinal cross sectional view taken through another novel pulley embodying this invention, which pulley is employed in the conveyor system shown in FIGURE 1.
FIGURE 8 is a elevational view of the pulley shown in FIGURE 7.

Reference is now made to FIGURES 7 and 8 of the drawings wherein the pulley 37 embodying this invention is shown in detail, which pulley is incorporated in the conveyor system shown in FIGURE 1. The pulley 37 comprises a hub 81 connected to an outer rim section 82 through a disc member 83. In the embodiment illustrated in FIGURES 7 and 8, at least the outer rim section is made of magnetic material such as cold rolled steel to provide a low reluctance magnetic flux path. The rim is formed with an annular groove 84 in the outer face thereof, which groove is shown off-set toward one side face designated 86 of the pulley with the center of the groove radius disposed about the distance of the groove radius from the face 86. The radius of the groove 84 is substantially equal to the radius of the cable 21 whereby the edge of the cable 21 lies substantially in the plane of the end face 86.

An annular groove 87 for the reception of permanent magnets 88 is formed in the face 86 of the pulley radially inwardly of the groove 84. The magnets 88 may be of a generally rectangular shape and have substantially parallel opposite polarity polar surfaces 88a and 88b. In the embodiment illustrated in FIGURES 7 and 8, all of the like polarity surfaces 88b are shown abutting the bottom of the groove 87 and may be secured thereto as by cementing or other suitable means not shown. The end of the adjacent magnets may be in substantially abutting relation, if desired, and the sides of the magnets are spaced from the groove side walls to prevent short circuiting of the magnetic flux field. Again, the magnets may be made of any suitable material such as "Alnico," barium ferrite, ceramic or the like. Ceramic magnets are preferred for their magnetic strength and ease of forming and producing. The magnets may be embedded in a suitable non-magnetic plastic material 89 extending along the sides and faces thereof.

The cans are fed to the pulley with the can end substantially parallel to the pulley face 86. Because the edge of the cable 21 lies substantially in the plane of the end face 86, cans are conveyed past the pulley without jamming. If desired, the relative dimensions of the groove 84 and cable 21 may be such that the edge of the cable 21 extends slightly outwardly from the plane of the end face 86 for support of the cans directly on the cable 21. The relative dimensions are not critical so long as the conveyed cans do not jam in going around the pulley. Thus, if desired, the guide rails 36 could be twisted slightly at the pulley to tilt the cans away from the pulley to prevent interference therewith. Another obvious expedient includes the use of a ramp member adjacent the pulley to tilt the cans as they pass onto the pulley. In any event the cans 27 are attracted by the pull of the magnets towards the pulley and cable and into engagement with the pulley, the cable, or both the pulley and cable depending upon the construction and relative dimensions thereof as mentioned above. The side guide rails 36 maintain the cans in registry with the cable and pulley and prevent the cans from tipping and from running off the pulley. With this novel pulley the direction of travel of the cans is changed without changing the orientation of the can axis. With a can 27 on the conveyor cable 21 at the pulley 37 a minimum length magnetic flux gap is formed between the can end and magnet for maximum efficiency of the magnet. The face 86 of the rim of the pulley comprises a polar surface and the magnetic flux circuit is indicated by broken lines 91 in FIGURE 7.

Figure 9:
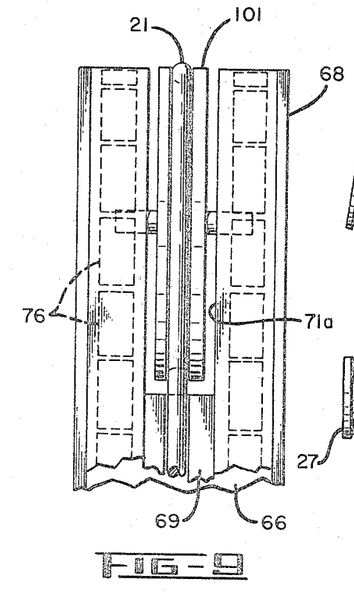
FIGURE 9 is a fragmentary front elevational view of a modified form of conveyor curved about a pulley of conventional design.
Figure 10:
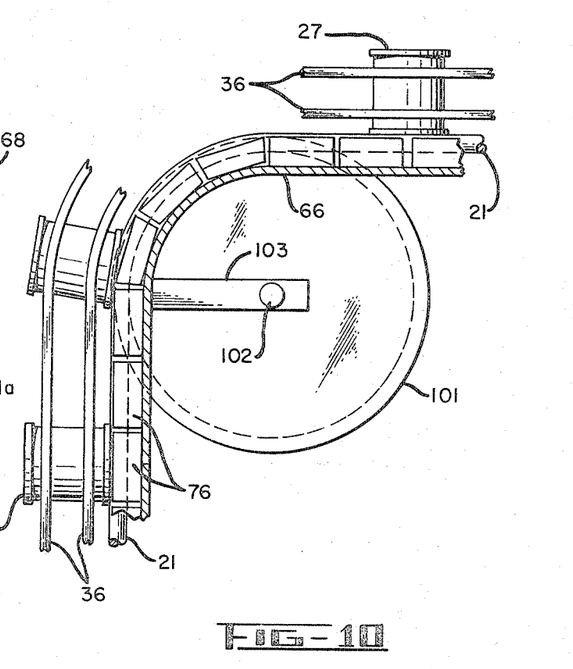
FIGURE 10 is a side elevational view of the arrangement shown in FIGURE 9.

With the novel conveyor of this invention the direction of travel of the cans may be changed by use of a conventional pulley in the manner illustrated in FIGURES 9 and 10 to which reference is now made. A pulley 101 of any well known design is shown mounted for rotation about a pivot pin 102 carried by a bracket 103 attached to the conveyor base 66. The article propelling cable 21 passes through the groove in the pulley and extends radially outwardly therefrom for support of the cans 27. The cans are conveyed to the pulley by a conveyor system of the type shown in FIGURES 5 and 6 and described in detail above. Briefly, such conveyor includes a base 66 of magnetic material with side walls 68 and center channel 69. The magnets 76 are attached to the base adjacent the channel 69. An elongated aperture 71a is formed in the base and the channel member 69 is cut away thereat. The apertured conveyor section at the pulley is curved with the center of curvature at the axis of the pivot pin 102. The cans 27 being conveyed are thereby attracted by the magnets 76 into engagement with the cable 21 and remain thereon as they are propelled past the pulley. This arrangement obviously serves as a substitute for the pulley 29 shown in FIGURES 2 and 3 described above. In another alternative arrangement for changing direction of travel of the cans a section of the conveyor may be simply curved (in a manner similar to that shown in FIGURE 10) and the cable 21 adapted to slide thereover. With this arrangement there is no requirement for a pulley 101 or aperture 71a.

Figure 11:
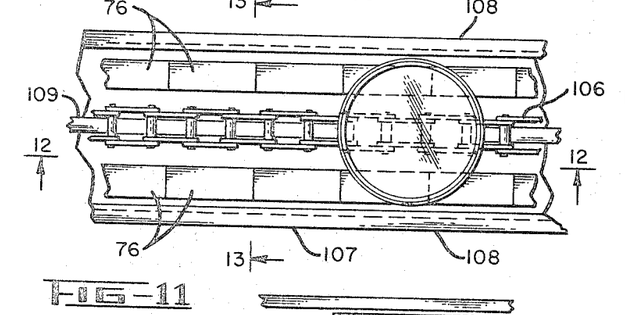
FIGURE 11 is a fragmentary front elevational view of a modified form of conveyor embodying a chain drive member for propelling the articles.
Figure 12:
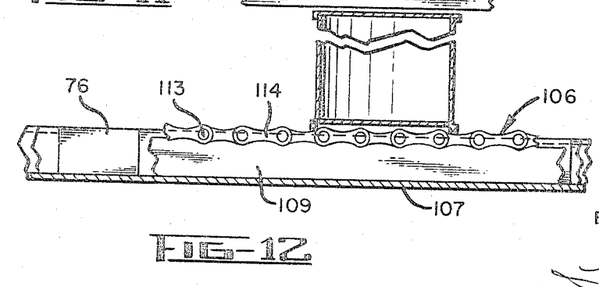
FIGURE 12 is a sectional view taken on line 12—12 of FIGURE 11.
Figure 13:
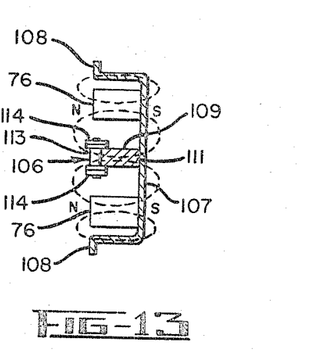
FIGURE 13 is a sectional view taken on line 13—13 of FIGURE 11.

As mentioned above, the endless article propelling member 21 is not limited to a cable but may comprise a chain, a belt or any other suitable means. In FIGURES 11, 12 and 13 a modified form of conveyor is shown which employs a chain 106 instead of the cable 21. The illustrated conveyor comprises a base member 107 having a U-shaped cross section and formed with laterally extending flanges 108 for the support thereof by any suitable supporting structure, not shown. If a roller chain is employed, as shown, a rail or track 109 may be secured to the center of the base as by welding 111 or other suitable means, for the support of the chain. With the chain in straddling position on the rail, as best seen in FIGURE 13, the roller elements 113, thereof ride on the top of the rail and the lower portions of the chain side links 114 extend along the rail sides. The magnets 76 are secured to the base at opposite sides of the rail as shown a spaced distance from the sides of the base 107. The upper surface of the chain extends slightly above the top surfaces of the magnets whereby the cans engage the chain and are supported a short, spaced distance above the magnets. If the chain links 114 are contoured as illustrated, the rim of the can may rest in a depressed part of the links. Of course, a chain with links having straight sides may be used if desired which chain would provide a substantially smooth surface for the support of the cans. Although the track 109 may be made of any suitable material such as plastic or metal, a rail of magnetic material, such as steel, is preferably employed. The rail then functions as a pole piece against which the chain (which is also made of magnetic material) is attracted. By magnetic attraction, the cans are drawn toward the magnets and into engagement with the chain.

Figure 14:
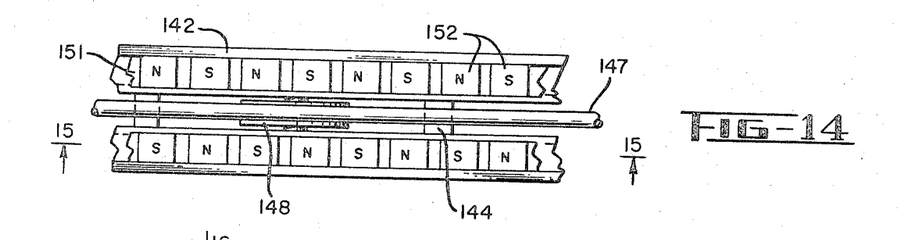
FIGURE 14 is a fragmentary front elevational view of another modified form of conveyor embodying this invention.
Figure 15:
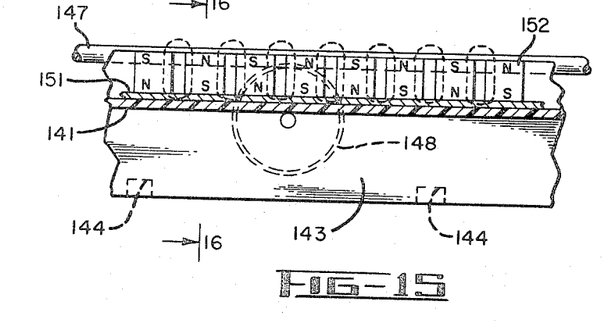
FIGURE 15 is a sectional view taken on line 15—15 of FIGURE 14.
Figure 16:
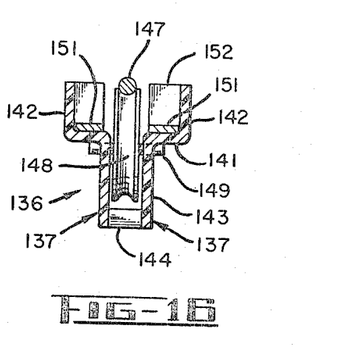
FIGURE 16 is a sectional view taken on line 16—16 of FIGURE 15.

Another modified magnetic conveyor embodying this invention is shown in FIGURES 14, 15 and 16 to which figures reference is now made. This conveyor comprises an elongated frame 136 comprising spaced frame members 137 made of non-magnetic material such as aluminum, or the like. The frame members 137 are of the same construction and each comprises an elongated base portion 141 having an upwardly turned outer edge forming a side wall 142 and a downwardly turned inner edge forming a flange 143. The frame members are interconnected in spaced relation as by cross bars 144 between the flanges 143. A driven elongated article propelling member, such as a cable 147 is supported on pulleys 148 spaced along the conveyor, only one such pulley being shown. The pulleys are supported on pivot pins 149 extending between the flanges 143. In accordance with this embodiment of the invention elongated strips 151 of magnetic material are attached to the base portion 141 of the frame members. (If desired, a unitary plate of magnetic material could be substituted for the two strips 151, in which plate apertures are formed through which the pulleys 148 extend.)

Magnets 152 of generally rectangular shape are attached to the strips 151, which magnets are laterally disposed from the cable 147. The magnets have generally parallel opposite polarity polar surfaces, one of which surfaces is attached to one of the strips 151. Since the frame members 137 are made of non-magnetic material, the sides of the magnets may be butted thereagainst. Adjacent magnets, however, are spaced apart as seen in FIGURES 14 and 16 and, as seen in FIGURE 16 opposite polarity polar surfaces of adjacent magnets are attached to the magnetic strips 151. Thus, the magnetic flux path for any one magnet includes the magnets adjacent thereto and the strip 151 to which they are attached. The top of the cable 147 extends slightly above the front face of the magnets whereby a narrow air gap is formed between the magnets and the ends of the cans being conveyed. Side rails, not shown, are included to prevent the cans from tipping sideways onto the magnets. If desired, the magnets may be embedded in a suitable plastic material, not shown. Since non-magnetic material such as aluminum is employed in the construction of the frame 136, this embodiment of the conveyor is relatively light weight.

Figure 17:
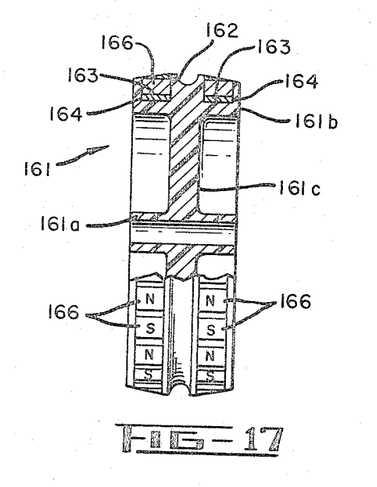
FIGURE 17 is a front elevational view which is similar to FIGURE 2 but showing a modified form of pulley embodying this invention.

In accordance with this invention the pulley 29a (shown in FIGURES 2 and 3) and the pulley 37 (shown in FIGURES 7 and 8) and described above may be modified in a manner similar to the modified conveyor shown in FIGURES 14, 15 and 16. In FIGURE 17, for example there is shown a pulley 161 similar to the pulley 29a shown in FIGURES 2 and 3, which pulley includes a hub 161a connected to an outer rim section 161b through a disc 161c. In this arrangement, the pulley is made of non-magnetic material, such as aluminum. A central groove 162 for the article propelling cable is formed in the center of the outer face of the rim 161b, and magnet receiving grooves 163 are disposed laterally thereof. A band 164 of magnetic material is attached to the bottom of the grooves, by cementing or other suitable means, and magnets 166 are attached to said bands. The sides of the magnets may abut the sides of the grooves. The magnets are spaced apart and have opposite polarity polar surfaces attached to said band so that the flux path for any one magnet includes the magnets adjacent thereto. The pulley 161 is used in the same manner as the pulley 29 and no further description thereof is believed to be required.

Figure 18:
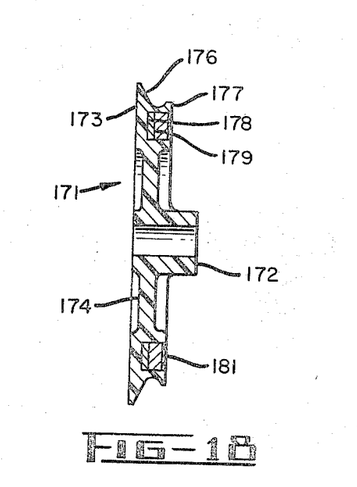
FIGURE 18 is a longitudinal cross sectional view which is similar to that of FIGURE 7 but showing another modified form of pulley embodying this invention.
Figure 19:
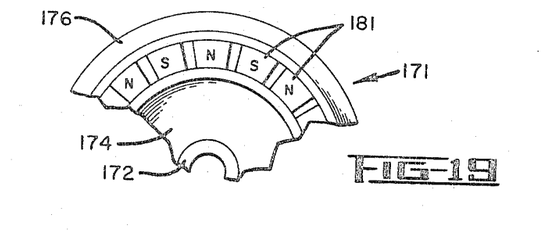
FIGURE 19 is a fragmentary side elevational view of the pulley shown in FIGURE 18.

In FIGURES 18 and 19 there is shown a pulley 171 which is similar to the pulley 37 shown in FIGURES 7 and 8. The pulley 171 comprises hub 172 connected to an outer rim section 173 through a disc member 174. In this arrangement the pulley is made of non-magnetic material such as aluminum. An annular groove 176 is formed in the face of the pulley for the reception of an article propelling member, not shown. As with the pulley 37, the groove and article propelling member are relatively dimensioned such that the side of the article propelling member lies substantially in the plane of the end face 177 of the pulley. An annular groove 178 is formed in the face 177 for the reception of a band 179 of magnetic material. Permanent magnets 181 of generally rectangular shape are attached to the band within the groove. The sides of the magnets may abut the groove side walls and adjacent magnets are spaced apart as seen in FIGURE 19. The magnets are attached to the band such that alternate north and south polar surfaces face outwardly from the groove in going around the pulley. As with the arrangement shown in FIGURE 17, the magnetic flux path for any one magnet includes the magnets adjacent thereto. The pulley 171 is used in the same manner as the pulley 37 described above and no further description is believed to be necessary.

In the novel, magnetic conveyors shown in FIGURES 1, 4, 5, 6 and 9 through 16 and described above the magnetic poles of the magnets themselves are disposed laterally of the article propelling member. In alternative constructions, the magnets may be provided with pole pieces having polar surfaces laterally disposed from the article propelling member. The magnets themselves may be located in any suitable position as desired. In FIGURES 20 through 23 transverse cross sectional views of such modified conveyors embodying this invention are shown.

Figure 20:
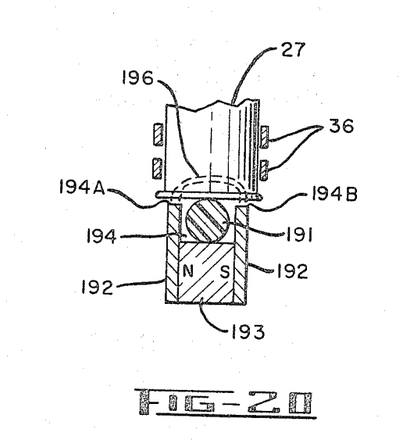
FIGURES 20 through 23 are transverse cross sectional views of further modified forms of conveyors embodying this invention.

Referring to FIGURE 20 a driven article propelling member in the form of a cable 191 of non-magnetic material such as plastic or stainless steel is shown for propelling the cans 27. A guideway 36 extends longitudinally of the article propelling member 191 to maintain the cans in registry therewith. The conveyor includes a pair of spaced elongated frame members 192 in the form of flat plates of magnetic material. The frame members are interconnected in spaced relation by suitable means not shown, and generally rectangular shaped magnets 193 (only one of which is seen in FIGURE 20) are positioned between the frame members 192, with opposite magnetic poles thereof affixed to the same. The upper edges of the frame members 192 extend above the magnets and together with the magnets form a channel designated 194 for the support of the driven cable 191. The cable 191 extends slightly outwardly of the channel for the support of the magnetic articles 27 thereon. With this arrangement the frame members 192 comprise magnetic pole pieces having north and south polar surfaces designated 194A and 194B, respectively, disposed at opposite sides of the cable 191 closely adjacent the magnetic cans 27. A very narrow air gap is thereby formed between the articles 27 and the pole surfaces 194A and 194B, the width of which is less than the thickness of the cable 191. The path of the magnetic flux lines between the pole surfaces, across the air gaps and through the can 27 is shown by the broken lines 196.

Figure 21:
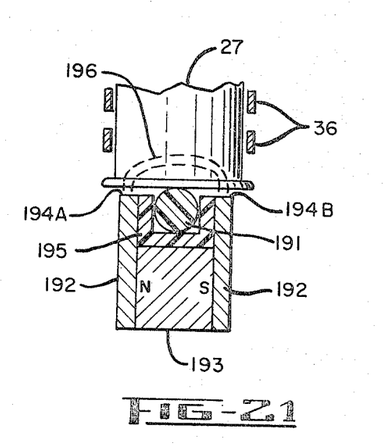

In FIGURE 21 a similar magnetic conveyor is shown, which conveyor includes a channel member 195 of plastic, stainless steel, paraffin impregnated wood or other suitable non-magnetic material which is disposed on the magnets 193 between the frame members 192. With this embodiment, the cable 191 is supported in the channel member 195 and extends slightly thereabove for the support of the cans 27. In other respects the conveyor is the same as that shown in FIGURE 20 and no further description thereof is believed to be necessary. Obviously, other means such as pulleys rotatably supported on pivot pins extending between the frame members 192 may be employed for the support of the cable 191.

Figure 22:
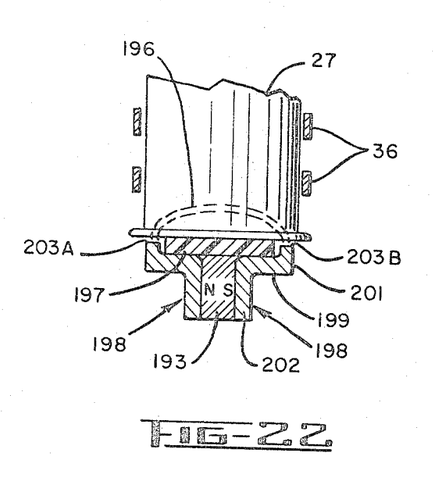

Reference is now made to FIGURE 22 where there is shown a conveyor which employs a driven non-magnetic flat belt 197 as the article propelling member. Although a guideway 36 is shown for maintaining the articles 27 in registry with the belt 197 it will be understood that no guideway may be required in those arrangements where the belt provides an adequate surface for the stable support of the articles 27 thereon. A pair of elongated frame members 198 of magnetic material is provided, each of which members includes a base portion 199 having an upwardly turned outer wall 201 and a downwardly turned inner edge forming a flange 202. The frame members are interconnected in spaced relation by suitable means, not shown, and magnets 193 (only one of which is seen in FIGURE 22) are located between the flanges 202. The poles of the magnets 193 abut the flanges and are secured thereto by any suitable means, not shown. The frame members 198 constitute pole pieces for the magnets, and north and south polarity polar surfaces 203A and 203B, respectively, are formed on the pole pieces, which surfaces are disposed at opposite sides of the belt 197 closely adjacent the bottom of cans 27 being conveyed. With minimum length air gaps formed between the polar surfaces 203A and 203B and the cans 27 the cans are strongly attracted toward said polar surfaces and into engagement with the belt 197.

Figure 23:
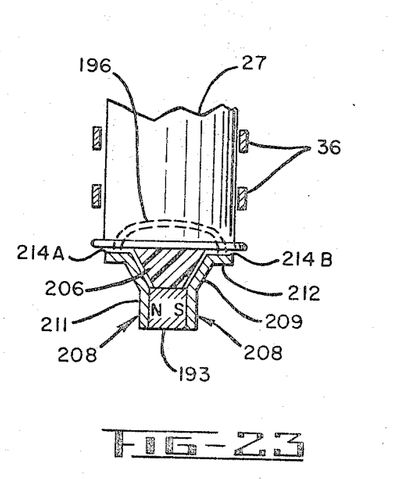

A similar arrangement employing a V-belt 206 rather than a flat belt is shown in FIGURE 23, to which reference is now made. In this arrangement a pair of elongated frame members 208 of magnetic material is provided, each of which members includes an outwardly tapered wall portion 209 with a downwardly extending flange 211 at the lower end and an outwardly extending flange 212 at the upper end. Again, the frame members are interconnected in spaced relation by any suitable means, not shown, and magnets 193 are positioned between the flanges 211 with the magnetic poles thereof fixed to the flanges by means not shown. The belt 206 rides in the channel formed by the tapered wall portions 209 and the top of the magnets 193. The cans are supported on the upper surface of the belt 206, which surface extends slightly above the flanges 212 on the frame members. The frame members 208 again comprise pole pieces and the upper surface of the flanges 212 thereon comprise polar surfaces designated 214A and 214B. The cans extend laterally from the belt 206 above said polar surfaces to form a narrow magnetic flux gap therebetween for attraction of the cans toward the belt.

The invention having been described in detail in accordance with the requirements of the patent statutes, various other changes and modifications may suggest themselves to those skilled in this art. For example, the article propelling member in the embodiment shown in FIGURES 5 and 6 may ride directly on the base 66 rather than on a channel member 69 and suitable side walls may be provided on the base adjacent the member 21 to guide the same. Further, although two rows of magnets 76 are shown in the apparatus of FIGURES 5 and 6, only a single row thereof may be required for many applications. It is intended that the above and other such changes shall fall within the scope and spirit of the invention as recited in the appended claims.

I claim:
1. A magnetic pulley for use in a conveyor system for propelling articles comprising an annular member formed with an annular groove to receive an article propelling member, means supporting said member for rotation about an axis, an annular magnet receiving groove formed in said member, and a plurality of magnets in said magnet receiving groove, said magnets having opposite polarity polar surfaces with one polar surface adjacent the bottom of the magnet receiving groove and the other polar surface adjacent the top of the magnet receiving groove.

2. The magnetic pulley recited in claim 1 wherein said annular member is of non-magnetic material, said pulley including a band of magnetic material in the bottom of said receiving groove, said magnets being attached to said band.

3. In a conveyor system for propelling magnetic articles, a magnetic pulley comprising an annular member, means supporting said member for rotation about an axis, said member being formed with a first annular groove within which an elongated article propelling member is adapted to extend, said member being formed with a second annular groove adjacent said first annular groove, and magnets in said second groove for attraction of magnetic articles thereto.

4. The conveyor system recited in claim 3 wherein said first groove is formed in the outer periphery of said annular member and said second groove is formed in one end face thereof.

5. The conveyor system recited in claim 3 wherein said article propelling member is disposed entirely within said groove at said pulley, and said magnetic articles are supported directly on said pulley thereat.

6. The conveyor system recited in claim 3 wherein said pulley is crowned at said first groove, and said articles being conveyed comprise cans with extending lips at the ends which lips engage said crown at the leading and trailing can edges.

7. The conveyor system recited in claim 5 wherein the article propelling member at said pulley has a downward return run section and an upward forward run section, means feeding articles generally downwardly onto said pulley a spaced distance from the article propelling member, said articles being fed onto said pulley at a different rate than the conveyor speed, said articles being brought substantially to conveyor speed by said pulley before reaching the forward run of said article propelling member.

8. A magnetic pulley for use in a conveyor system of the type which includes an elongated article propelling member for propelling magnetic articles, said pulley comprising a drum, said drum being formed with a first annular groove in the outer periphery thereof in which said article propelling member is disposed, one edge of said article propelling member upon which conveyed articles are supported lying substantially in the plane of one side face of the drum, said drum being formed with a second annular groove in said one side face adjacent said first groove, and a plurality of magnets in said second groove, said conveyed articles being attracted toward said magnets in going around said drum.

9. In a magnetic conveyor of the type which includes a driven elongated article propelling member for conveying magnetic articles, a magnetic system comprising:
a member of magnetic material adjacent said article propelling member,
a plurality of magnets each having generally parallel opposite polarity polar surfaces,
one polar surface of each magnet being attached to said magnetic member and the other polar surface of each magnet being disposed for attraction of conveyed magnetic articles toward said article propelling member, said magnets being spaced apart with adjacent magnets having opposite polarity polar surfaces attached to said magnetic member, the magnetic flux path for one magnet including opposite polarity magnets adjacent thereto.

10. The magnetic conveyor as defined in claim 9 wherein the magnetic member is included in a straight run of the article propelling member.

11. The magnetic conveyor as defined in claim 9 wherein the magnetic member is included in a pulley over which the driven elongated article propelling member extends.

12. A pulley for use in a conveyor system for propelling magnetic articles comprising:
   an annular member formed with an annular groove to receive an article propelling member,
   means for supporting said annular member for rotation about an axis, and
   a plurality of magnets arranged in a first row adjacent said groove, each magnet having opposite polarity polar surfaces with one polar surface attached to said annular member, said magnets being spaced apart with adjacent magnets in the row having opposite polarity polar surfaces attached to said annular member, the magnetic flux path for each magnet including the opposite polarity magnets adjacent thereto.

13. The magnetic pulley as defined in claim 12 including a second row of magnets adjacent said groove opposite said first row, the magnets in said second row also being spaced apart with adjacent magnets having opposite polarity polar surfaces attached to said annular member, the magnetic flux path for each magnet in the second row including the opposite polarity magnets adjacent thereto in the second row.

14. A magnetic pulley for use in a conveyor system for propelling articles comprising:
   an annular member formed with an annular groove to receive an article propelling member,
   means supporting said annular member for rotation about an axis,
   an annular magnet receiving groove formed in said annular member,
   a plurality of magnets in said magnet receiving groove,
   said magnets having opposite polarity polar surfaces with one polar surface adjacent the bottom of the magnet receiving groove and the other polar surface adjacent the top of the magnet groove,
   said magnets being spaced apart on said annular member with adjacent magnets having opposite polarity polar surfaces attached thereto, the magnetic flux path for each magnet including the magnets adjacent thereto.

References Cited

UNITED STATES PATENTS

| | | |
|---|---|---|
| 393,491 | 11/1888 | Stone. |
| 2,642,174 | 6/1953 | Buccicone _____________ 198—41 |
| 2,833,391 | 5/1958 | Wilcox _____________ 198—41 X |
| 3,028,708 | 4/1962 | Vaughan _____________ 209—19 X |
| 3,061,071 | 10/1962 | Ruehrbein _________ 198—41 X |
| 3,153,471 | 10/1964 | Arnett _____________ 198—41 X |
| 3,209,892 | 10/1965 | Jones _______________ 198—41 |

FOREIGN PATENTS

| | | |
|---|---|---|
| 506,578 | 12/1954 | Italy. |
| 876,698 | 9/1961 | Great Britain. |

EVON C. BLUNK, *Primary Examiner.*

EDWARD A. SROKA, *Examiner.*